(No Model.)

J. ANTHONY.
RASP.

No. 324,912. Patented Aug. 25, 1885.

Witnesses,
Geo. H. Strong.
J. H. Rourke.

Inventor,
Jesse Anthony
By Dewey & Co.
Attorneys

UNITED STATES PATENT OFFICE.

JESSE ANTHONY, OF COVELO, CALIFORNIA.

RASP.

SPECIFICATION forming part of Letters Patent No. 324,912, dated August 25, 1885.

Application filed March 6, 1885. (No model.)

*To all whom it may concern:*

Be it known that I, JESSE ANTHONY, of the town of Covelo, Mendocino county, State of California, have invented an Improvement in Files and Rasps and I hereby declare the following to be a full, clear, and exact description of the same.

My invention relates to that class of files and rasps which are made up of separate plates, adapted to rock on their bearings, to enable them to be sharpened; and my invention consists in a series of independent plates, pivoted in transverse rows and united by longitudinal strips, which are suitably clamped to hold the plates in position, all of which I shall hereinafter fully describe.

The object of my invention is to provide a file or rasp, the teeth of which may be ground or sharpened, and thus preserve the implement long after it would otherwise be considered useless.

Figure 2:
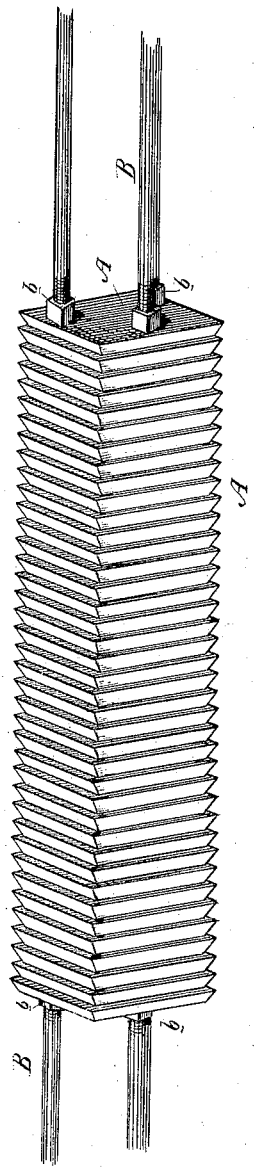
Figure 3:
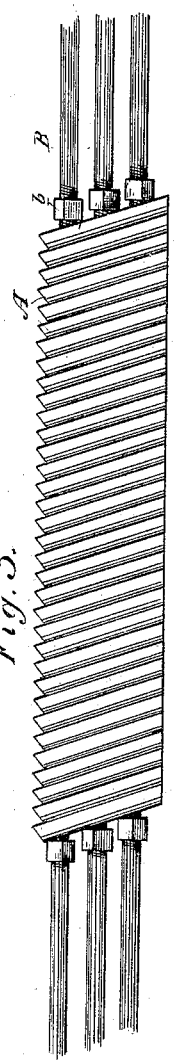
Figure 1:
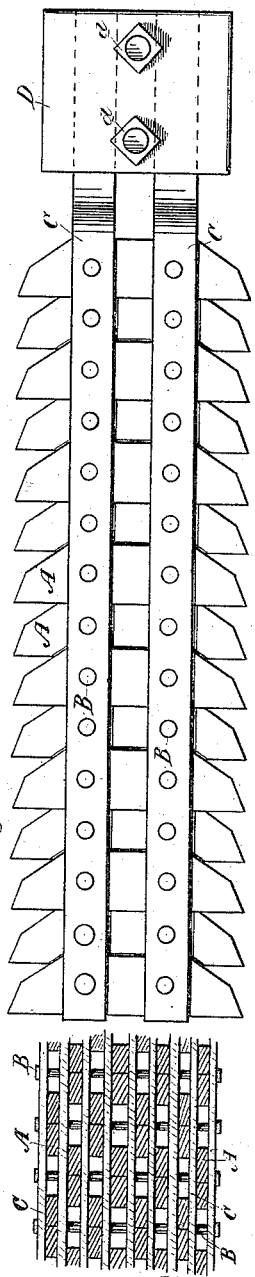

Referring to the accompanying drawings, Figure 1 is an elevation and cross section of my file. Fig. 2 is a perspective view of a modification of my file, showing the plates in position. Fig. 3 is an elevation of the same, showing the plates inclined, and one side ground down.

A are the plates which form the teeth. These lie in parallel, vertical planes, in as many rows as may be required for the length of the implement, and either in parallel, transverse rows, or dodging each other, as here shown, for in rasps, particularly, the regularity of position of the teeth is not an object.

B are small rods forming pivots. These pass through the teeth transversely of the implement, and are connected by longitudinal strips C, the ends of which are clamped between plates D, set by screws $d$.

The operation of sharpening the implement is as follows: By loosening the clamp-plates and grasping the ends of the strips C, moving one set of strips in one direction and the other in the reverse direction, the teeth A may be made to turn on their pivots to planes inclined to the strips. Their edges are then ground down to a level plane, and when the strips C are moved to their normal position the teeth are brought back to planes at right angles to said strips, whereby their ends present bevels forming the necessary cutting-edges.

In Figs. 2 and 3, I show a modification of the file. The plates A are rectangular in shape, or they may be of other forms—such as triangular, &c.—according to the character of the file, and the use to which it is intended to be put. These plates lie side by side in parallel planes, and are joined together in one connected series by one or more bolts or tie-rods, B, which pass through the series longitudinally. The rods are not tight in the plates, but the connection is loose enough to form a kind of bearing on which the plates may be moved to a slight angle in the direction of the length of the rods, and to either side of the right angle in which they normally stand with reference to said rods. The plates are held to their position by means of the nuts $b$ at each end of the series, which, when set up, bind them together tightly as a whole and form the file. To sharpen it the nuts are loosened and the plates turned to inclined planes, as I have described in connection with the file shown in Fig. 1.

When the teeth of files or rasps made as I have described become dull, they can be readily sharpened, and the implement is as good as ever. With ordinary files and rasps sharpening is impracticable, and they have to be thrown away.

Although fine files can be made as I have described, my invention is particularly applicable for the larger and coarser files and rasps, and especially for such as are used on horses' hoofs, and known as "horse-rasps."

Having thus described my invention, what I claim as new, and desire to secure by Letters Patent, is—

A file or rasp consisting of the series of separate parallel plates A, the transverse pivot-bolts B in the plates, the connecting-strips C on the bolts, and the clamping-plates D on the strips, all arranged and adapted to operate substantially as herein described.

In witness whereof I have hereunto set my hand.

JESSE ANTHONY.

Witnesses:
J. K. CHAMBERS,
J. P. THOMSON.